United States Patent [19]
Huggins

[11] Patent Number: 6,047,839
[45] Date of Patent: Apr. 11, 2000

[54] RAIL CAR BUFFER

[76] Inventor: Russell J. Huggins, 165 Lisburn Rd., Wellsville, Pa. 17365

[21] Appl. No.: 09/017,383

[22] Filed: Feb. 3, 1998

[51] Int. Cl.$^7$ .................................................. B61G 11/00
[52] U.S. Cl. ..................... 213/220; 213/223; 213/40 R; 213/44; 213/45
[58] Field of Search .................................. 213/40 R, 42, 213/43, 44, 45, 46, 48, 8, 220, 221, 223; 188/271, 287; 267/34, 196, 204

[56] References Cited

U.S. PATENT DOCUMENTS

| | | |
|---|---|---|
| 1,548,773 | 8/1925 | Ziebarth . |
| 2,719,612 | 10/1955 | Bourcier de Carbon De Previnquires ........................ 188/88 |
| 2,985,319 | 5/1961 | Simmons ................................. 213/45 |
| 3,040,907 | 6/1962 | Pelabon .................................... 213/43 |
| 3,084,809 | 4/1963 | Lucchese ................................ 213/220 |
| 3,110,367 | 11/1963 | Roberts .................................... 188/96 |
| 3,176,972 | 4/1965 | Deschner .................................. 267/1 |
| 3,207,324 | 9/1965 | Blake ......................................... 213/8 |
| 3,301,410 | 1/1967 | Seay ......................................... 213/43 |
| 3,307,842 | 3/1967 | Ellis, Jr. .................................... 267/1 |
| 3,554,387 | 1/1971 | Thornhill et al. ...................... 213/223 |
| 3,596,774 | 8/1971 | MacCurdy ................................. 213/8 |
| 3,605,960 | 9/1971 | Singer ..................................... 188/287 |
| 3,693,767 | 9/1972 | Johnson .................................. 188/285 |
| 3,729,101 | 4/1973 | Brambilla et al. ......................... 213/45 |
| 3,779,396 | 12/1973 | Zeilinski ................................. 213/223 |
| 3,782,710 | 1/1974 | Selke et al. ............................. 267/118 |
| 3,795,390 | 3/1974 | Kendall et al. ........................... 213/45 |
| 3,819,219 | 6/1974 | Pamer ...................................... 293/88 |
| 3,840,097 | 10/1974 | Holley ..................................... 188/287 |
| 3,889,934 | 6/1975 | Kamman .................................. 267/34 |
| 3,891,199 | 6/1975 | Willich et al. ........................... 267/139 |
| 3,997,037 | 12/1976 | Schupner ................................. 188/315 |
| 3,998,302 | 12/1976 | Schupner ................................. 188/285 |
| 4,002,244 | 1/1977 | Matsumoto et al. ...................... 213/43 |
| 4,026,418 | 5/1977 | Hawthorne .................................. 213/8 |
| 4,026,533 | 5/1977 | Hennells ................................. 267/124 |

(List continued on next page.)

FOREIGN PATENT DOCUMENTS

| | | |
|---|---|---|
| 0 021 698 | 1/1981 | European Pat. Off. . |
| 373152 | 5/1985 | European Pat. Off. . |
| 225167 | 11/1986 | European Pat. Off. . |
| 260968 | 9/1987 | European Pat. Off. . |
| 451630 | 4/1990 | European Pat. Off. . |
| 518126 | 5/1991 | European Pat. Off. . |
| 0 595 160 | 10/1992 | European Pat. Off. . |
| 196 19 214 | of 0000 | Germany . |
| 189102 | 10/1922 | United Kingdom . |
| 812562 | 4/1959 | United Kingdom . |
| 2027517 | 2/1980 | United Kingdom . |
| 1 587 297 | 4/1981 | United Kingdom . |
| 2059005 | 4/1981 | United Kingdom . |
| 2261489 | 11/1991 | United Kingdom . |
| 2281114 | 2/1995 | United Kingdom . |
| 2312659 | 11/1997 | United Kingdom . |
| WO 89/02385 | 3/1989 | WIPO . |
| WO 93/12360 | 6/1993 | WIPO . |
| WO 95/00382 | 6/1993 | WIPO . |

OTHER PUBLICATIONS

"TecsPak Hydraulic Buffer for Reducing the Acceleration of Car Impacting" David G. Anderson, Proceedings of the ASME/IEEE Spring Joint Railroad Conference, Mar. 31–Apr. 2, 1992, pp. 69–74.

"Buffer gear for coaches", International Union of Railways, UIC Code 528 OR, 7$^{th}$ edition, Jan 1, 1991, pp. 1–19.

"Wagons Buffers with a stroke of 105 mm", International Union of Railways, UIC Code 526–1 OR, 1$^{st}$ edition, Jan. 1, 1981 (Reprint, Jan. 11, 1991), pp. 1–31.

"TecsPak 70 kJ–H Hydraulic Enhanced Buffer Spring", Miner Enterprises Inc. (2 pages).

*Primary Examiner*—S. Joseph Morano
*Assistant Examiner*—Robert J. McCarry, Jr.
*Attorney, Agent, or Firm*—Edward J. Brosius; F. S. Gregorczyk; Stephen J. Manich

[57] ABSTRACT

A rail car buffer with a capsule body and a mechanical ring spring and a hydraulic spring arranged in parallel in the body. The hydraulic spring includes an internal reservoir to receive hydraulic oil displaced during collapse of the buffer.

10 Claims, 5 Drawing Sheets

U.S. PATENT DOCUMENTS

| | | | |
|---|---|---|---|
| 4,040,523 | 8/1977 | Carle et al. | 213/46 |
| 4,043,545 | 8/1977 | Dial et al. | 267/116 |
| 4,057,129 | 11/1977 | Hennells | 188/285 |
| 4,058,175 | 11/1977 | Dressel, Jr. et al. | 188/285 |
| 4,076,225 | 2/1978 | Houghton | 267/34 |
| 4,078,638 | 3/1978 | Koyama et al. | 188/288 |
| 4,482,035 | 11/1984 | Heideman et al. | 188/287 |
| 4,660,687 | 4/1987 | Williams et al. | 188/287 |
| 4,709,791 | 12/1987 | Houghton | 188/315 |
| 4,742,898 | 5/1988 | Lee | 188/287 |
| 4,805,517 | 2/1989 | Conley et al. | 92/8 |
| 5,025,938 | 6/1991 | Bomgardner et al. | 213/43 |
| 5,064,033 | 11/1991 | Koike et al. | 188/306 |
| 5,076,451 | 12/1991 | Conley et al. | 213/43 |
| 5,104,101 | 4/1992 | Anderson et al. | 213/45 |
| 5,160,123 | 11/1992 | Danieli | 267/226 |
| 5,178,240 | 1/1993 | Houghton | 188/315 |
| 5,388,711 | 2/1995 | Hodges | 213/8 |
| 5,415,303 | 5/1995 | Hodges et al. | 213/43 |
| 5,465,944 | 11/1995 | Page et al. | 267/217 |
| 5,487,480 | 1/1996 | Page et al. | 213/43 |
| 5,676,265 | 10/1997 | Miller | 213/43 |

RAIL CAR BUFFER

FIELD OF THE INVENTION

The invention relates to rail car cushioning devices, particularly rail car buffers.

DESCRIPTION OF THE PRIOR ART

A rail car corner buffer includes a collapsible capsule body surrounding a spring assembly which resists collapse of the buffer. Buffers are mounted in pairs on the ends of rail cars for contact with buffers mounted on adjacent rail cars to protect the rail cars and lading from excessive forces during impacts, coupling, and train action events.

Buffers used in rail cars in European countries are required to meet standards established by the Union Internationale Chemins de Fer (International Union of Railways, (UIC)). The standards permit interchange of rail service between member countries. The UIC standards specify the physical dimensions of the buffer, the stroke of the buffer, the force-travel envelope for the buffer, the energy consumption requirements for the buffer and other characteristics of the buffer, and have become increasingly stringent without altering the size of the buffer capsule body.

Conventional rail car buffers have used a hydraulic spring with a piston movable in a pressure cylinder filled with hydraulic fluid. During collapse of the buffer, the piston is forced into the cylinder. Motion of the piston forces hydraulic fluid through one or more apertures and out of the cylinder to dissipate energy. The displaced fluid flows into a reservoir. UIC standards require that a highly efficient hydraulic spring is located in the restricted interior volume of a standard size capsule body. This hydraulic spring must be arranged in parallel with a mechanical spring.

A conventional rail car buffer includes a ring spring and a cylindrical hydraulic spring arranged in parallel so that both the springs collapse together. The hydraulic spring is located inside the ring spring and includes a cylinder, a piston in the cylinder, a piston rod and an expandible bladder surrounding the piston rod, outside the cylinder. The bladder is attached and moves with the piston. During collapse and expansion of the buffer, hydraulic fluid is flowed between the cylinder and bladder. The bladder serves as an expandable reservoir for hydraulic fluid displaced from the cylinder during collapse of the buffer.

Another conventional rail car buffer includes a coil spring and a cylindrical hydraulic spring arranged in parallel so that both springs collapse together. A reservoir is provided in the pressure cylinder piston rod. During collapse of the buffer hydraulic fluid flows through the piston and into the reservoir.

Conventional rail car buffers with mechanical and hydraulic springs in parallel have a number of disadvantages. The buffers are expensive to manufacture, and they do not reliably meet UIC requirements. External reservoir bladders may crack and are difficult to seal.

Thus, there is a need for an improved high capacity rail car buffer spring assembly having a mechanical spring and a hydraulic spring arranged in parallel meeting UIC size and performance requirements.

SUMMARY OF THE INVENTION

The invention is a rail car buffer with an improved high performance spring assembly. The spring assembly includes a ring spring and a hydraulic spring arranged in parallel so that both the springs collapse together. The ring spring surrounds the hydraulic spring. The spring assembly fits in a standard buffer capsule and meets UIC performance standards.

The hydraulic spring includes a cylinder housing with a pressure cylinder, a piston in the pressure cylinder, a piston rod extending outwardly from one end of the pressure cylinder and an internal reservoir surrounding the pressure cylinder. The interior of the pressure cylinder is completely filled with hydraulic oil and the reservoir is partially filled with hydraulic oil with a gas pocket at the top of the reservoir. The volume of the gas pocket is greater than the decrease in volume of the interior chambers in the cylinder housing during collapse of the buffer. Oil displaced from the pressure cylinder flows into the reservoir and reduces the size of the gas pocket. Three embodiments are disclosed.

In the first two embodiments, a ring spring extends between the ends of the capsule body and the hydraulic spring is inside one end of the spring. An annular reservoir extends between the ends of the cylinder housing and surrounds the pressure cylinder. The reservoir is longer than the stroke of the piston to provide space for a large gas pocket at the top of the reservoir.

In a third embodiment, the length of the reservoir is about equal to the stroke of the piston and the ring spring extends to one end of the cylinder housing. A step is provided in the housing. The portion of the reservoir away from the spring is radially enlarged to provide space for a large gas pocket at the top of the reservoir, above the pressure cylinder.

Each embodiment of the invention uses a mechanical spring, preferably a friction or ring spring having a plurality of interfitted circular rings with engaged conical friction surfaces. During collapse of the buffer, the rings are forced together and slide against one another, generating forces that dissipate energy.

A rail car buffer with the improved spring assembly has significant advantages over conventional rail car buffers. The disclosed buffers meet UIC standards and include internal reservoirs surrounding the pressure cylinder. The internal reservoir allows the use of apertures or pressure actuated valves in the pressure cylinder to control fluid flow between the pressure cylinder and the reservoir and cushion impacts. The size and spacing of the apertures or valves can be easily modified, providing flexibility in designing the force-travel envelope for the buffer. Construction is simplified. The need for complicated reservoirs is eliminated.

Other objects and features of the invention will become apparent as the description proceeds, especially when taken in conjunction with the accompanying drawings illustrating the invention, of which there are four sheets.

DESCRIPTION OF THE PREFERRED EMBODIMENTS

Figure 1:
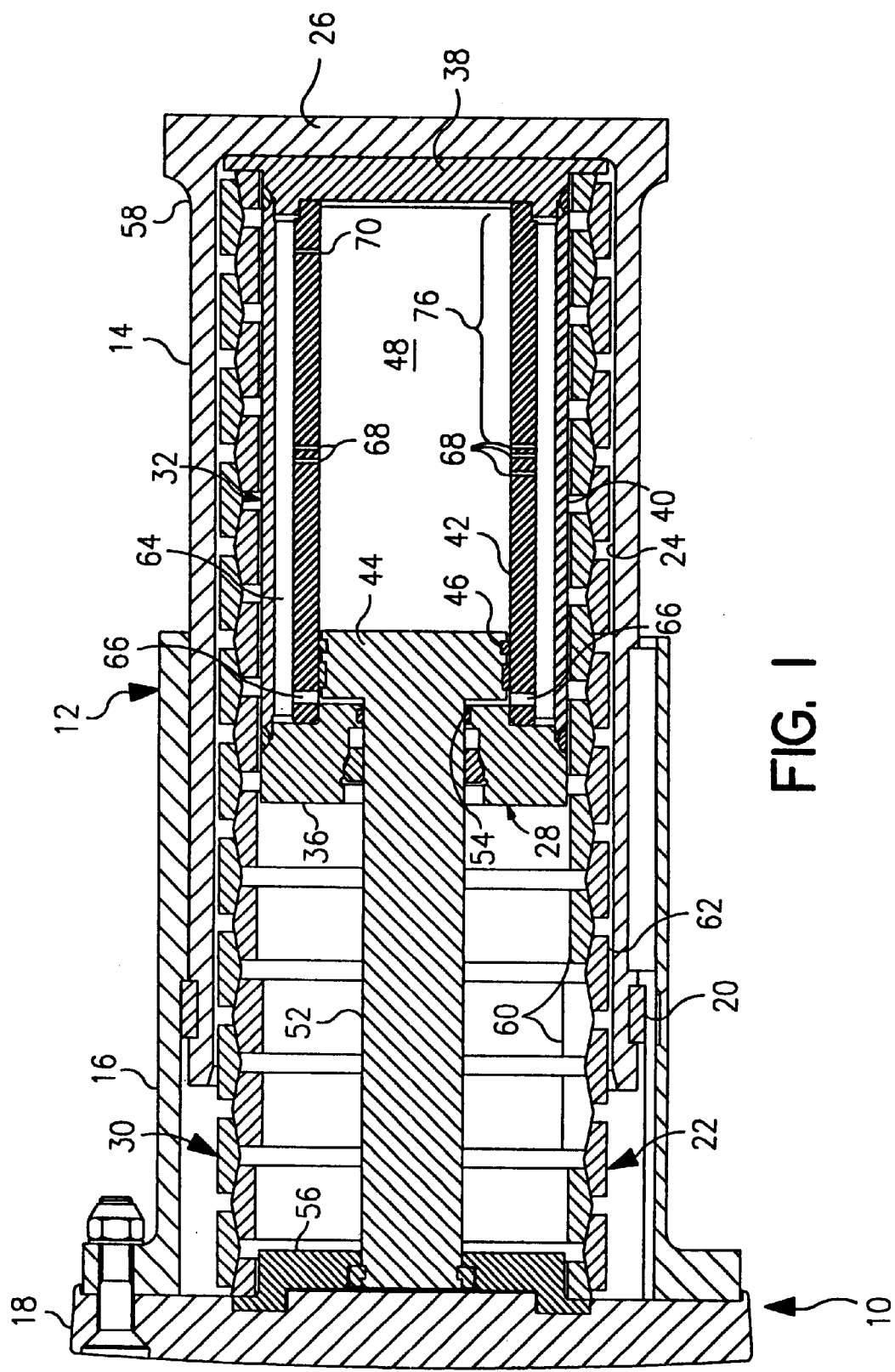
FIG. 1 is a vertical sectional view taken through a first embodiment rail car buffer showing the buffer extended.
Figure 2:
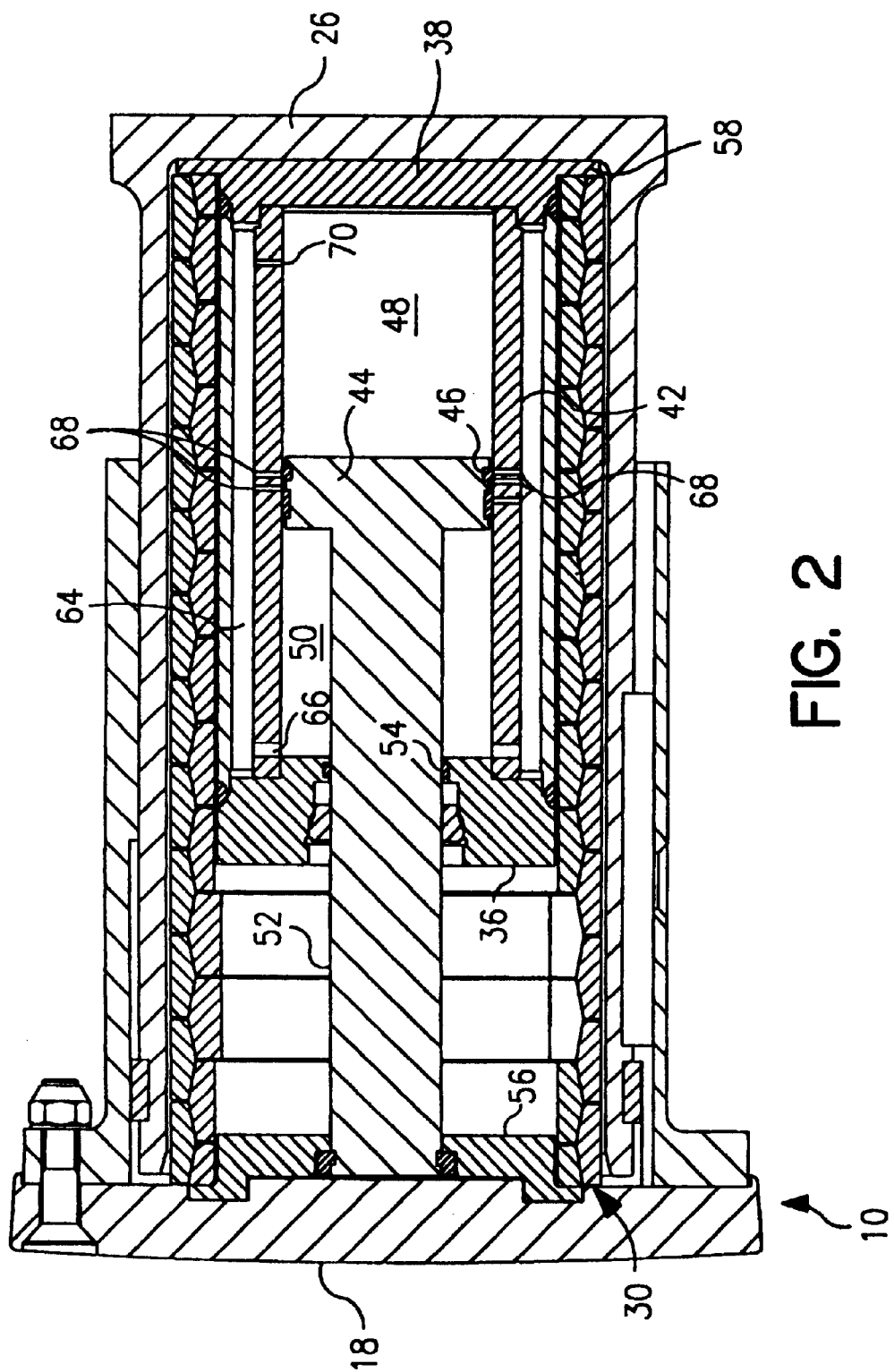
FIG. 2 is a vertical sectional view of the buffer of FIG. 1 showing the buffer collapsed.
Figure 3:
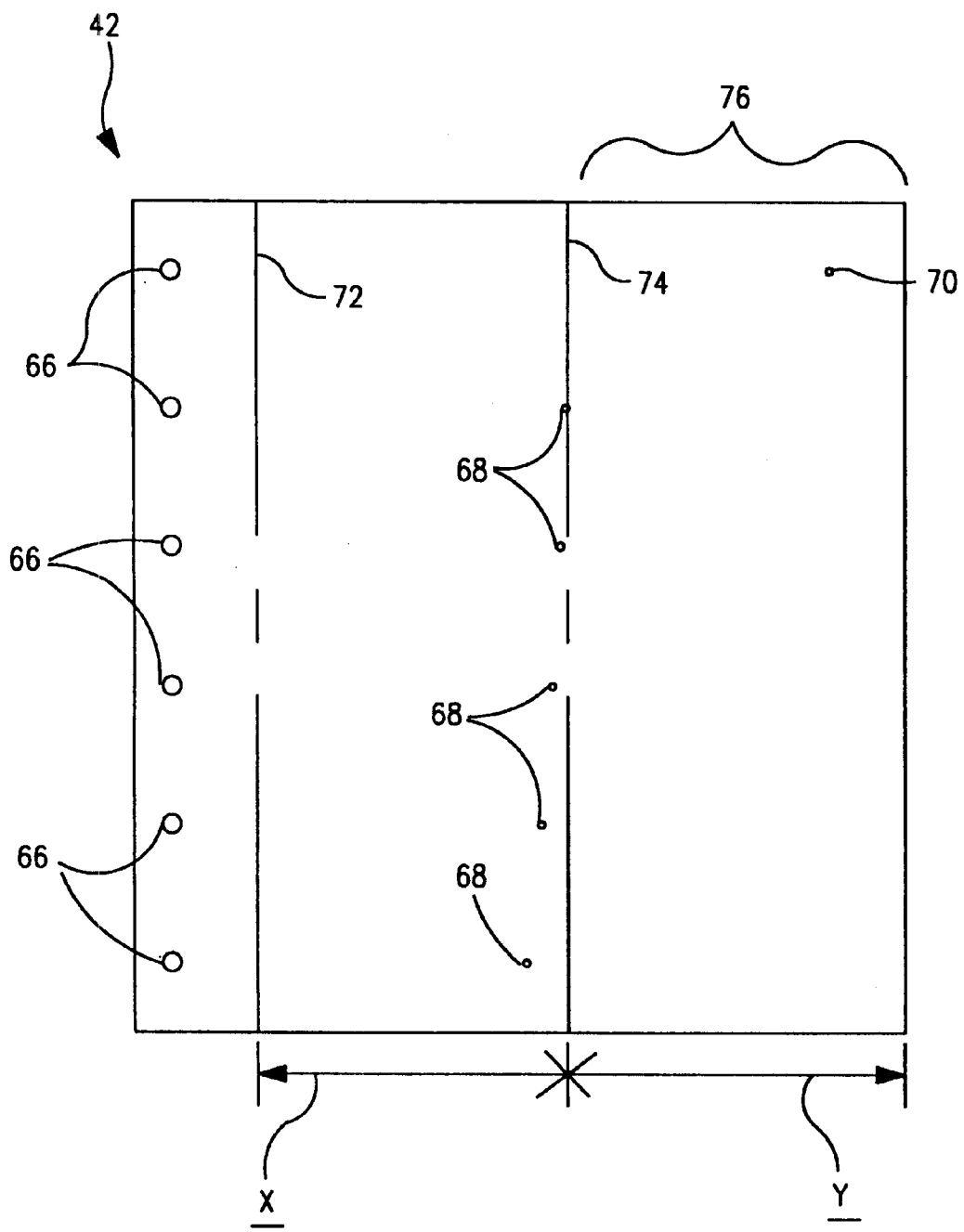
FIG. 3 is a schematic illustration of the ports in the pressure cylinder wall of the buffer of FIG. 1, showing the wall unwound and laid flat.

FIGS. 1–3 illustrate a first embodiment rail car buffer 10 including a capsule body 12 having a tubular base 14 and tubular plunger 16 fitted on base 14. The plunger includes an outwardly facing contact head 18 which engages the corresponding head of the buffer on an adjacent rail car. Base 14 is configured to be mounted on and extend outwardly from one end of a rail car. The base and plunger are held together by ring 20. The capsule body conforms to UIC standards.

Buffer spring assembly 22 is confined within cylindrical interior chamber 24 of the capsule body and extends between and engages base plate 26 and head 18. FIG. 1 illustrates the buffer spring assembly 22 in the fully extended capsule body with plunger 16 held against ring 20. The spring assembly 22 includes a piston-type hydraulic spring 28 and a mechanical friction or ring spring 30. Springs 28 and 30 are arranged in parallel so that an impact exerted on the buffer collapses both springs together. Spring 30 is preloaded and holds the capsule body extended.

Hydraulic spring 28 includes a cylinder housing 32 abutting base plate 26. Cylinder housing 32 includes a front head 36, a rear head 38, and an outer cylinder 40 extending between the heads. Inner pressure cylinder 42 also extends between the heads. Fluid displacement piston 44 in cylinder 42 carries a seal ring 46 which engages the interior surface of pressure cylinder 42 and divides the space within cylinder 42 into front cylindrical chamber 48 and rear annular chamber 50. Seal ring 46 prevents leakage of hydraulic fluid past the piston. Piston rod 52 extends from piston 44 out of cylinder housing 32 through bore or rod passage 54 in rear head 38. A rod seal prevents leakage of hydraulic fluid through the rod passage. Rod plate 56 is fastened to the free end of piston rod 52 and abuts head 18.

Ring spring 30 is confined between circumferential flange 58 on rear head 38 and a corresponding flange on rod plate 56. The spring 30 includes sets of engaged inner and outer rings 60 and 62. The rings surround the piston rod and the cylinder housing of the hydraulic spring assembly. Spring 30 is preloaded under compression between head 38 and plate 56 with the rings 60, 62 engaging each other when the buffer is extended, as illustrated in FIG. 1.

Cylinders 40 and 42 define annular reservoir 64 extending between heads 36 and 38 and surrounding the piston and chambers 48 and 50. Return apertures 66 extend through pressure cylinder 42 at the end of reservoir 64 adjacent head 36 and communicate the reservoir and rear chamber 50. A number of small diameter flow control apertures 68 extend through cylinder 42 and communicate the interior of the cylinder with reservoir 64. A single return flow aperture 70 extends through cylinder 42 and communicates chamber 48 and reservoir 64.

The interior chambers of cylinder housing 32 are filled with hydraulic oil. The chambers in the pressure cylinder are completely filled. The reservoir is partially filled. A gas pocket is left at the top of reservoir 64 above chamber 48. The pocket is sufficiently large to accommodate net hydraulic fluid flowed from the pressure cylinder into the reservoir during collapse of the buffer. The gas in the pocket may be air.

The spacing and layout of apertures 66, 68 and 70 are illustrated in FIG. 3. In the figure, pressure cylinder 42 is shown unwound and laid flat with the right side of cylinder 42 adjacent rear head 38 and the left side of cylinder adjacent front head 36. Line 72 illustrates the position of the sealing ring 46 when the buffer is fully extended and the piston is adjacent the front head 36. Line 74 indicates the position of the ring when the buffer is fully collapsed. When the buffer is fully collapsed ring 46 has moved past or covers all apertures 68. The distance X between lines 72 and 74 represents the collapse stroke of the buffer. The distance Y from line 74 to the rear end of the cylinder is approximately equal to the distance X. The collapse stroke for the buffer is about one half the length of the pressure cylinder.

FIG. 1 illustrates the position of the corner buffer 10 fully extended. Ring spring 30 holds contact head 18 out and away from base plate 26. In this position, piston 44 is spaced a short distance from front head 36, the volume of rear chamber 50 is at a minimum and the volume of the front chamber 48 is at a maximum. Both chambers are filled with hydraulic oil to assure hydraulic absorption of impact energy.

Upon an impact sufficient to overcome the preload of ring spring 30, contact head 18 moves toward base plate 26. Spring 30 is compressed arid hydraulic oil in chamber 48 is flowed out through apertures 68 and 70 into reservoir 64 to cushion the impact. The flow of oil into the reservoir compresses the gas pocket at the top of the reservoir. The initial volume of the pocket is greater than the volume of oil flowed into the reservoir less the volume of oil flowed into rear chamber 50.

FIG. 2 illustrates buffer 10 fully collapsed. Ring spring 30 is compressed between flange 58 and plate 56. Compression of the ring spring causes sliding of rings 60 relative to rings 62, generating frictional forces and stress that dissipate impact energy.

Simultaneously with the mechanical cushioning of impact, piston 44 moves from the extended position towards the rear head 38 to cushion the impact hydraulically. Collapse of the buffer is resisted by the hydraulic resistance to flow of oil through the apertures 68 and 70. Oil flows out of front chamber 48 into reservoir 64 and oil flows from reservoir 64 through apertures 66 and into rear chamber 50. Piston rod 52 moves into rear chamber 50 so that the volume of the rear chamber is insufficient to receive all of the oil flowing out of front chamber 48. The surplus oil is stored in reservoir 64 and reduces the volume of the gas pocket in the top of the reservoir.

During initial collapse of the buffer, the piston forces oil through all the apertures 68 and 70. As the piston moves along the stroke ring 46 passes over individual apertures 68 until at the end of the stroke, as shown in FIG. 2, the apertures 68 nearest front head 36 have been passed by the ring and the ring overlies and closes the remaining aperture 68 at line 74. At the full collapsed position, return flow aperture 70 is open to permit flow of oil into chamber 48 during initial relatively slow expansion of the buffer by the compressed ring spring. Initial expansion opens apertures 68 to increase the volume of oil flowing into the buffer and accelerate expansion back to the fully extended position of FIG. 1.

The number and spacing of apertures 68 can be modified to alter the force-displacement curve of the hydraulic spring. Return apertures may be located as desired on the otherwise imperforate portion 76 of cylinder 42 between line 74 and the end of the cylinder adjacent rear head 38. The return aperture may extend from chamber 48 to the reservoir through the rear head 38 or from chamber 48 directly to chamber 50 through the piston, as desired.

Spring backed pressure valves may be mounted in apertures 68 to enhance the force-travel envelope for the buffer. A pressure valve can also be mounted in an aperture extending through piston 44 to communicate the front and rear chambers.

Figure 4:
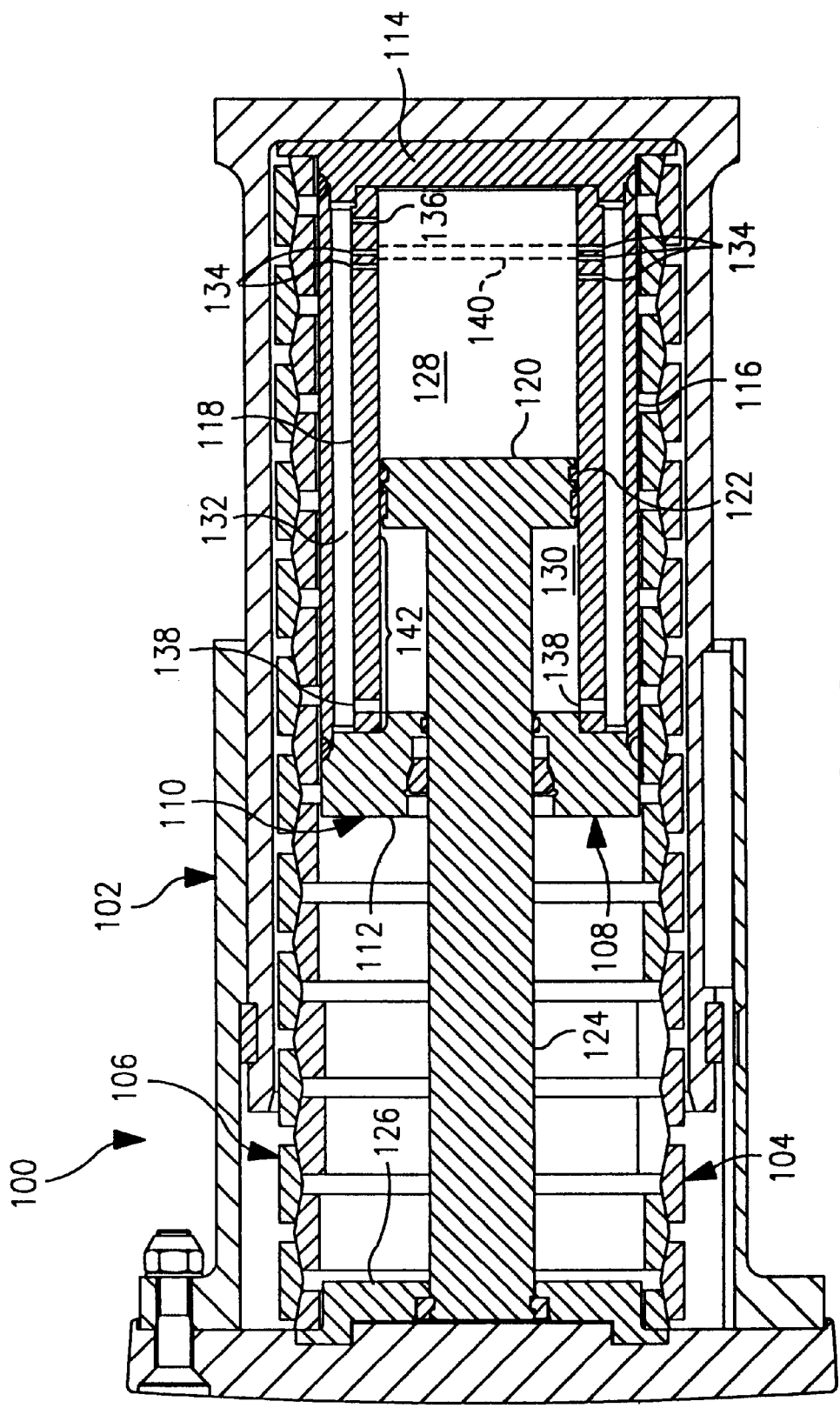
FIG. 4 is a view like FIG. 1 illustrating a second embodiment buffer.

FIG. 4 illustrates a second embodiment rail car buffer 100 similar to buffer 10. Buffer 100 includes a capsule body 102 and a buffer spring assembly 104 mounted in the capsule body. The assembly 104 includes a ring spring 106, like ring spring 30, and a hydraulic spring 108. The ring spring and hydraulic spring act in parallel and are collapsed and expanded together, as in buffer 10. The hydraulic spring includes a cylinder housing 110 having a front head 112, rear head 114 and outer cylinder 116 as in cylinder housing 32. An inner pressure cylinder 118 is located inside cylinder 116 and extends between heads 112 and 114. Fluid displacement piston 120 includes a sealing ring 122, is fitted in cylinder 118 and is connected to piston rod 124. The free end of the piston rod 124 is connected to a rod plate 126. Preloaded ring spring 106 is confined between rod plate 126 and rear head 114 and normally holds the buffer in the extended position of FIG. 4.

Piston rod 124 is longer than rod 52 of the first embodiment buffer so that when buffer 100 is extended piston 120 is located approximately midway along cylinder 118. Cylinder 118 is the same length as cylinder 42. Front chamber 128 is located between piston 120 and rear head 114 and rear chamber 130 is located between the piston and the front head 112. Annular reservoir 132 is located between cylinders 116 and 118 and extends from head 112 to head 114. Piston rod 124 extends through front head 112. A number of flow apertures 134 are formed through pressure cylinder 118 adjacent the rear head 114. A single return flow aperture 136 extends through pressure cylinder 118 between apertures 134 and the rear head. Return apertures 138 extend through cylinder 118 adjacent front head 112.

The collapse stroke of buffer 10 is the same length as the collapse stroke of buffer 100 and moves seal ring 122 from the position of FIG. 4 to the position 140, adjacent rear head 114. During the collapse of the buffer ring spring 106 is compressed and hydraulic fluid is flowed from chamber 128 through apertures 134 and 136 to cushion the impact, as previously described. At the end of a full impact stroke, the seal ring 122 has passed over or covers all of the flow apertures 134, leaving aperture 136 open for limited return flow of hydraulic fluid into chamber 128 during initial expansion of the buffer. Reservoir 132 extends along the full length of the pressure cylinder 118. The interior chambers of the cylinder housing are filled with hydraulic oil with a sufficient large gas pocket in the top of reservoir 132 to accommodate oil flowed from chamber 128 during collapse despite reductions of interior volume, as previously described. The return flow aperture 136 may be located at any desired position on the otherwise imperforate portion of pressure cylinder 118 located between the end of the cylinder adjacent rear end 114 and adjacent position 140. Aperture 136 may extend through the rear head or through the piston, if desired.

In buffer 100 the piston 120 is located a distance further away from the support bearing in front head 112 than in buffer 10. The greater spacing between the piston and the front head provides increased support for the piston rod against lateral loadings exerted on the free end of the buffer.

In buffer 100, pressure cylinder 118 extends between front and rear heads 112 and 114. Operation of the buffer as described does not require that the pressure cylinder extend continuously between the front and rear heads. If desired, portion 142 of the pressure cylinder 118 extending from the front head to the piston when the buffer is extended may be eliminated. In such case, the remaining portion of pressure cylinder 118 may be joined to or made integral with rear head 114. Removal of portion 142 of the pressure wall 118 eliminates chamber 130 and enlarges reservoir 132 radially inwardly. This alteration does not enlarge the gas pocket in the reservoir because the gas pocket must be located above the top of chamber 128 to prevent gas from collecting in the chamber and impairing hydraulic cushioning of impacts.

Figure 5:
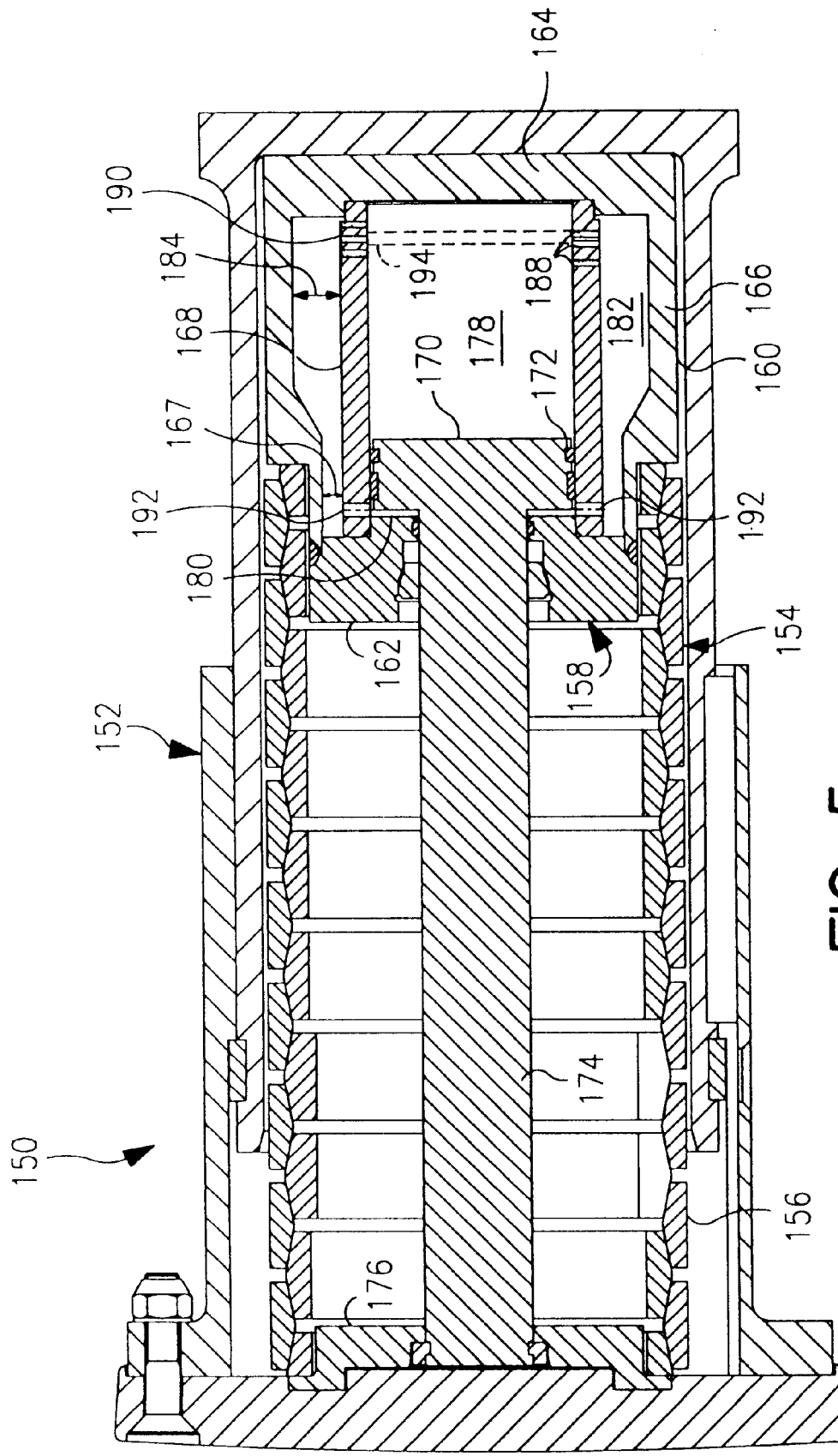
FIG. 5 is a view like FIG. 1 illustrating a third embodiment buffer.

Rail car buffer 150 shown in FIG. 5 is similar to prior described buffers 10 and 100 and includes a capsule body 152 and a buffer spring assembly 154 in the capsule body. The assembly includes ring spring 156 and hydraulic spring 158 connected in parallel to collapse and expand together. The hydraulic spring includes a cylinder housing 160 having a front head 162 and a rear head 164 having a diameter greater than the diameter of the front head and extending radially to fully occupy the interior of the capsule body. Outer cylinder 166 extends from the outer circumference of rear head 164 along the capsule body to inward step 167 and from the step to the front head 162. Inner pressure cylinder 168 extends between heads 162 and 164. The step faces the front head.

Fluid displacement piston 170 is fitted in cylinder 168 and includes a seal ring 172 engaging cylinder 168. Piston rod 174 extends from the piston through a bore in the front head 162 to a free end which is joined to rod plate 176. Preloaded spring 156 is confined between the rod plate and step 167 of cylinder 166.

Piston 170 divides the interior of cylinder 168 into a front chamber 178 and a rear chamber 180. Annular reservoir 182 is located between cylinders 166 and 168 and heads 162 and 164. The radial height 184 of reservoir 182 from the step 167 to the rear wall 164 is greater than the radial height 186 of the reservoir from the step to the front wall. The increased radial height of the reservoir from the step to the rear wall is provided by locating the portion of cylinder 166 between the step and the rear wall adjacent the tubular base of the capsule body. The end of the ring spring abuts step 167 away from rear head 164. The location of step 167 between heads 102 and 104 may be varied, if desired. The end of spring 156 may abut front head 162.

A plurality of flow apertures 188, a single return aperture 190 and a number of larger diameter return apertures 192 are provided in cylinder 168 and correspond to the similar apertures disclosed and described in connection with the first and second embodiments. Buffer 150 has a collapse stroke moving sealing ring 172 from the position shown in FIG. 5 to the position indicated by line 194 to pass or cover all flow apertures 188.

The interior chambers and reservoir in cylinder housing 160 are filled with hydraulic oil with a gas pocket in the top of the reservoir sufficiently large to accommodate oil flowed into the reservoir during collapse of the buffer. In this embodiment, the length of the reservoir along the longitudinal axis of the buffer is considerably less than the length of reservoirs 64 and 132 in the first two embodiments and is only slightly longer than the collapse stroke of the buffer. However, the increased radial height 184 of the reservoir between the step and the rear head provides an enlarged gas pocket. The gas pocket is larger than the difference between the volume of oil displaced from the front chamber and the volume of the piston rod moved into the rear chamber and is correspondingly reduced during collapse. At full collapse, flow aperture 190 is not covered and permits expansion of the buffer. Buffer 150 is collapsed and expanded as previously described in connection with buffers 10 and 100.

During collapse of the disclosed buffers, hydraulic fluid is flowed out of the front chambers through flow apertures or spring backed pressure valves in the pressure cylinder. The apertures and valves both form flow ports through which hydraulic fluid is flowed outwardly from the pressure cylinders.

During collapse hydraulic fluid is flowed from the front chamber into the reservoir and fluid in the reservoir flows into the rear chamber. However, the rear chamber is occupied by the piston rod and does not accommodate all of the hydraulic fluid displaced from the front chamber. The volume of the hydraulic fluid displaced from the front chamber, less the volume of hydraulic fluid flowed into the rear chamber, or the net displaced hydraulic fluid, is stored in the reservoir by compressing and reducing the volume of the gas pocket. The gas pocket has an initial volume greater than or equal to the volume of the net hydraulic fluid flowed into and retained in the reservoir by collapse of the buffer.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim as my invention is:

1. A rail car buffer comprising:
   a capsule body including a tubular base having a body plate at one end of the buffer and a tubular plunger having a contact head at the other end of the buffer, said base and plunger being fitted together to define a generally cylindrical interior chamber between the body plate and head;
   a hydraulic spring in said interior chamber extending between said plate and said contact head, said hydraulic spring including a housing at one end of said interior chamber with opposed front and rear heads and a pressure cylinder extending between and joining the heads, a fluid displacement piston in the pressure cylinder engaging the interior surface of said pressure cylinder, a piston rod extending from said piston sealingly through said front head to a free end at the other end of said interior chamber, a rod plate on the free end of the piston, the rod plate abutting one of said body plate and said contact head, the rear head abutting the other of said body plate and contact head, a cylindrical outer body extending between and joining said front and rear heads and spaced outwardly from the pressure cylinder, said pressure cylinder, outer body, front head and rear head defining an annular reservoir located between said pressure cylinder and outer body, flow control apertures in the pressure cylinder, hydraulic fluid in the housing, said hydraulic fluid entirely filling the pressure cylinder and partially filling the reservoir, a gas pocket at the top of the reservoir above the said pocket located above the interior of the pressure cylinder; and
   a cylindrical mechanical spring in said interior chamber arranged in parallel with said hydraulic spring and having opposed spring ends, said mechanical spring surrounding the hydraulic spring and extending along the length of the interior chamber with one mechanical spring end abutting the rod plate, the other mechanical spring end abutting the hydraulic spring housing at said other end, and surrounding both the hydraulic spring housing and the hydraulic reservoir.

2. The rail car buffer as in claim 1 wherein said mechanical spring comprises a preloaded ring spring.

3. The rail car buffer as in claim 2 including a step in the housing, said step facing the front head and overlying the reservoir, said other mechanical spring end abutting the step.

4. The rail car buffer as in claim 3 wherein the radial height of the reservoir adjacent the rear head is greater than the radial height of the reservoir adjacent the front head.

5. The rail car buffer as in claim 1 wherein said ring spring completely surrounds the housing and reservoir, and the other mechanical spring end abuts the rear head.

6. The rail car buffer as in claim 1 wherein said piston has a collapse stroke extending along a first portion of the pressure cylinder, the first portion having a length approximately one half the length of the pressure cylinder, said flow control apertures extend through said first portion of said pressure cylinder only, said pressure cylinder including a second portion located between the first portion and the rear head, and at least one return flow aperture, all of said apertures communicating the interior of the pressure cylinder and the reservoir.

7. The rail car buffer as in claim 6 wherein the first portion of the pressure cylinder is located adjacent the rear head.

8. The rail car buffer as in claim 1 wherein the piston has a collapse stroke extending along a first portion of the pressure cylinder and having a length approximately one half the length of the pressure cylinder, said flow control apertures extend through said first portion of said pressure cylinder only, said first portion of the pressure cylinder located adjacent the front head, and including a second portion of the pressure cylinder extending from the first portion to the rear head, at least one return flow aperture, said second portion and said rear head being imperforate to the flow of hydraulic fluid with the exception of said at least one return flow aperture, all of said apertures communicating the interior of the pressure cylinder and the reservoir.

9. A rail car buffer spring assembly of the type adapted to be fitted in the interior chamber of a buffer capsule to cushion impacts, the buffer spring assembly comprising a hydraulic spring and a cylindrical ring spring arranged in parallel to collapse and expand together, said ring spring having opposed ends; said hydraulic spring including a cylinder housing having front and rear heads, a pressure cylinder located between said heads, an outer cylinder extending between said heads and surrounding the pressure cylinder, an annular reservoir located between the cylinders and extending between the heads, a fluid displacement piston in the pressure cylinder, a piston rod joined to the piston and extending from the piston out of the cylinder housing through the front head to a free end, an attachment member on the free end of the piston rod, hydraulic fluid in the cylinder housing, said hydraulic fluid completely filling the interior of the pressure cylinder and partially filling the reservoir, a gas pocket at the top of the reservoir, said piston having a collapse stroke extending along a first portion of the pressure cylinder, said portion having a length approximately one half the length of the pressure cylinder, a plurality of flow control apertures each extending through the first portion of the pressure cylinder, at least one return flow aperture, all of said flow control apertures and said one or more return flow apertures communicating the interior of the pressure cylinder and the reservoir wherein upon collapse of the buffer spring assembly by an impact the piston moves along the collapse stroke, flows hydraulic fluid out of the pressure cylinder through said apertures and passes said flow control apertures, the pressure cylinder including a second portion located between said first portion and said rear head, said second portion being imperforate excepting for said one or more return flow apertures, said hydraulic spring located inside the ring spring with one end of the ring spring abutting the attachment member and the other end of the ring spring abutting the cylinder housing and overlapping the reservoir wherein such end of the ring spring is radially outwardly from the reservoir and the ring spring and reservoir overlap, said ring spring being preloaded to hold the hydraulic spring extended.

10. The rail car buffer as in claim 9 wherein said ring spring completely surrounds the cylinder housing from the front head to the rear head and the other end of the ring spring abuts the rear head.

\* \* \* \* \*